United States Patent
Tehranipoor et al.

(10) Patent No.: US 9,218,506 B2
(45) Date of Patent: Dec. 22, 2015

(54) METHODS AND SYSTEMS FOR PREVENTING HARDWARE TROJAN INSERTION

(71) Applicant: University of Connecticut, Farmington, CT (US)

(72) Inventors: Mohammad Tehranipoor, Mansfield, CT (US); Kan Xiao, Willimantic, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 14/204,656

(22) Filed: Mar. 11, 2014

(65) Prior Publication Data
US 2014/0283147 A1 Sep. 18, 2014

Related U.S. Application Data

(60) Provisional application No. 61/777,200, filed on Mar. 12, 2013.

(51) Int. Cl.
| | |
|---|---|
| *G06F 21/76* | (2013.01) |
| *G06F 21/75* | (2013.01) |
| *G06F 21/70* | (2013.01) |
| *G06F 21/71* | (2013.01) |

(52) U.S. Cl.
CPC ............... *G06F 21/76* (2013.01); *G06F 21/70* (2013.01); *G06F 21/71* (2013.01); *G06F 21/75* (2013.01)

(58) Field of Classification Search
CPC ......... G06F 21/70; G06F 21/71; G06F 21/75; G06F 21/76
See application file for complete search history.

(56) References Cited

U.S. PATENT DOCUMENTS

| | | | | | |
|---|---|---|---|---|---|
| 6,058,252 | A * | 5/2000 | Noll | ................... | G06F 17/5068 716/113 |
| 6,066,179 | A * | 5/2000 | Allan | ..................... | H01L 22/20 257/E21.525 |
| 6,463,567 | B1 * | 10/2002 | Kozai | ................. | G06F 17/5022 716/103 |
| 6,757,883 | B1 * | 6/2004 | Shrowty | ............. | G06F 17/5081 716/111 |
| 2004/0230926 | A1 * | 11/2004 | Berry | ................. | G06F 17/5036 716/115 |
| 2010/0007366 | A1 * | 1/2010 | Watanabe | ........ | G01R 31/31908 324/750.3 |
| 2011/0072407 | A1 * | 3/2011 | Keinert | ............. | G06F 17/5072 716/122 |
| 2013/0300454 | A1 * | 11/2013 | Wang DiMarzio | . | G06F 17/5068 326/41 |

OTHER PUBLICATIONS

Sanno, "Detecting Hardware Trojans", Ruhr-university, Jul. 2009, pp. 1-26 https://www.emsec.rub.de/media/crypto/attachments/files/2011/03/benjamin_sanno.semembsec_termpaper_20090723_final.pdf.*

(Continued)

*Primary Examiner* — Jung Kim
*Assistant Examiner* — Carlos M De Jesus Lassala
(74) *Attorney, Agent, or Firm* — Ballard Spahr LLP (57) ABSTRACT

Provided are methods and systems for preventing hardware Trojan insertion. An example method can comprise determining unused space in an integrated circuit (IC), selecting a plurality of built-in self-authentication (BISA) filler cells based on the determined unused space, and placing the selected plurality of BISA filler cells onto the unused space. The plurality of BISA filler cells can be connected to form a plurality of BISA blocks. The plurality of BISA blocks can correspond to a plurality of signatures. A modification of one or more BISA filler cell can lead to an alteration of one or more signatures.

18 Claims, 9 Drawing Sheets

(a) Original placement (b) An example of unused spaces file (.unsp)

(c) BISA cells ranked based on cell size (d) Placement after BISA cells insertion (56) References Cited

OTHER PUBLICATIONS

Su et al., "Optimal Decoupling Capacitor Sizing and Placement for Standard-Cell Layout Designs", IEEE,, vol. 22, No. 4, Apr. 2003, pp. 428-436 http://ieeexplore.ieee.org/stamp/stamp.jsp?arnumber=1190980&tag=1.*

Aarestad, J., et al., "Detecting Trojans through leakage current analysis multiple supply pad IDDQs," IEEE Transactions on Information Forensics and Security, vol. 5, issue 4, pp. 893-904, 2010.

Agrawal, D. et al., "Trojan Detection using IC Fingerprinting," IEEE Symp. on Security and Privacy (SP), pp. 296-310, 2007.

Banga, M. and Hsiao, M., "A novel sustained vector technique for the detection of hardware trojans," IEEE VLSI Design, pp. 327 C332, Jan. 2009. (6 pages).

Chakraborty, R. and Bhunia, S. "Security against Hardware Trojan through a Novel Application of Design Obfuscation," IEEE/ACM Int. Conf. on Computer-Aided Design (ICCAD), pp. 113-116, 2009.

Chakraborty, R., et al., "MERO: A statistical approach for hardware Trojan detection," Workshop on Cryptographic Hardware and Embedded Systems, pp. 396-410, 2009.

Filler Cells and Decap Cells, EDA Scripting and Automation, available at http://edaautomation.blogspot.com/2010/06/filler-cells.html, Jun. 10, 2010 (1 page).

Li, J. and Lach, J., "At-Speed Delay Characterization for IC Authentication and Trojan Horse Detection," IEEE Int. Hardware-Oriented Security and Trust (HOST), pp. 8-14, 2008.

Salmani, H., et al., "A Novel Technique for Improving Hardware Trojan Detection and Reducing Trojan Activation Time," IEEE Transactions on VLSI, 2011 (12 pages).

Synopsys Inc., "IC Compiler, The next-generation physical design system," Synopsys Datasheet, 2010.

Synopsys Inc., "Synopsys 90nm Generic Library for Teaching IC Design," University program.

Tehranipoor, M. and Koushanfar, F., "A Survey of Hardware Trojan Taxonomy and Detection," IEEE Design and Test of Computers, pp. 10-25, Jan.-Feb. 2010.

Tehranipoor, M. and Wang, C., "Introduction to Hardware Security and Trust," Springer, Aug. 2011.

Weste, N. and Harris, D. "CMOS VLSI Design: A Circuits and Systems Perspective," 4th edition, Addison-Wesley, 2010.

Yeh, C. and Marek-Sadowska, M., "Timing-aware power noise reduction in placement," IEEE Transactions on Computer-Aided Design of Integrated Circuits and Systems, vol. 26, Issue 3, pp. 527-541, 2007.

* cited by examiner

(a) s38417 before BISA insertion (b) s38417 after BISA insertion (c) System05 before BISA insertion (d) System05 after BISA insertion

FIG. 8

(a) Test coverage improvement (b) Test coverage of pseudorandom patterns

FIG. 9

METHODS AND SYSTEMS FOR PREVENTING HARDWARE TROJAN INSERTION

CROSS REFERENCE TO RELATED PATENT APPLICATION

This application claims priority to U.S. Provisional Application No. 61/777,200 filed Mar. 12, 2013, herein incorporated by reference in its entirety.

GOVERNMENT SUPPORT CLAUSE

This invention was made with government support under 57958CS awarded by the Army Research Office (ARO) and CNS-0844995 awarded by the National Science Foundation. The government has certain rights in the invention.

BACKGROUND

As the process of integrated circuits (ICs) shrinks to very deep submicron levels, the complexity and cost of IC fabrication increases significantly. Only a few companies can afford maintaining an entire supply chain from design to fabrication. Almost all design houses have become fabless. IC products are fabricated in third party foundries to lower costs, which can provide attackers with opportunities to make malicious inclusions and alterations, known as hardware Trojans. Hardware Trojans have become a serious problem for security-critical applications, because they may cause malfunctions, lower the reliability of ICs, leak confidential information to adversaries or even destroy a system under certain conditions. Trojans can be inserted into a design at any phase from circuit design to circuit fabrication. These and other shortcomings are addressed in the present disclosure.

SUMMARY

It is to be understood that both the following general description and the following detailed description are exemplary and explanatory only and are not restrictive, as claimed. Provided are methods and systems for preventing hardware Trojan insertion. An example method can comprise determining unused space in an integrated circuit (IC), selecting a plurality of built-in self-authentication (BISA) filler cells based on the determined unused space, and placing the selected plurality of BISA filler cells onto the unused space.

In an aspect, an integrated circuit (IC) can comprise a base member, a plurality of functional blocks attached to the base member, which can result in unused space on the base member. A plurality of BISA filler cells can be placed onto the unused space. The plurality of BISA filler cells can be connected to form a plurality of BISA blocks. The plurality of BISA blocks can correspond to a plurality of signatures. A modification of one or more BISA filler cells can lead to an alteration of one or more signatures.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3(a) illustrates original placement of a plurality of BISA filler cells;

FIG. 3(b) illustrates an example format of UNSP file;

FIG. 3(c) illustrates BISA filler cells ranked based on cell size;

FIG. 3(d) illustrates placement after BISA filler cell insertion;

DETAILED DESCRIPTION

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for preventing hardware Trojan insertion. Specifically, a plurality of built-in self-authentication (BISA) filler cells can be used to fill unused spaces in an integrated circuit (IC) layout design. The plurality of BISA filler cells can be connected to form a plurality of BISA blocks that are independent from original circuits (e.g., functional blocks) of the IC. By testing the logic of the BISA blocks composed of BISA filler cells, circuit designers can determine whether one or more BISA filler cells have been modified. For example, BISA filler cells can be designed so that stuck-at patterns can test all gates in BISA filler cells, thus any change in BISA filler cells can be detected. In an aspect, BISA filler cells can be standard circuit cells, which can make them difficult to identify. An example method can comprise determining unused space in an integrated circuit (IC), selecting a plurality of built-in self-authentication (BISA) filler cells based on the determined unused space, and placing the selected plurality of BISA filler cells into the unused space.

In an aspect, BISA filler cells impact on an IC design can be negligible, because there is no connection between BISA filler cells and original circuits (e.g., functional blocks). BISA filler cells and original circuits do not work simultaneously. In another aspect, the BISA filler cells can provide decoupling capacitances to minimize voltage drop when an original circuit is working. In an aspect, logic of the plurality of BISA filler cells can be tested and a signature can be generated. Any modification of one or more BISA filler cells can result in a different signature. Thus, placement of BISA filler cells can prevent hardware Trojan insertion or make hardware Trojan insertion extremely difficult. BISA filler cells can be used in any flat and System-on-Chip (SOC) hierarchical IC design. In an aspect, BISA filler cells can be placed and routed automatically by running an automated program in a layout design flow. In an aspect, the automated program can be developed to be compatible with a standard circuit layout design tool, such as Synopsys IC Compiler, Cadence Encounter and Mentor Graphics IC Station.

Figure 1:
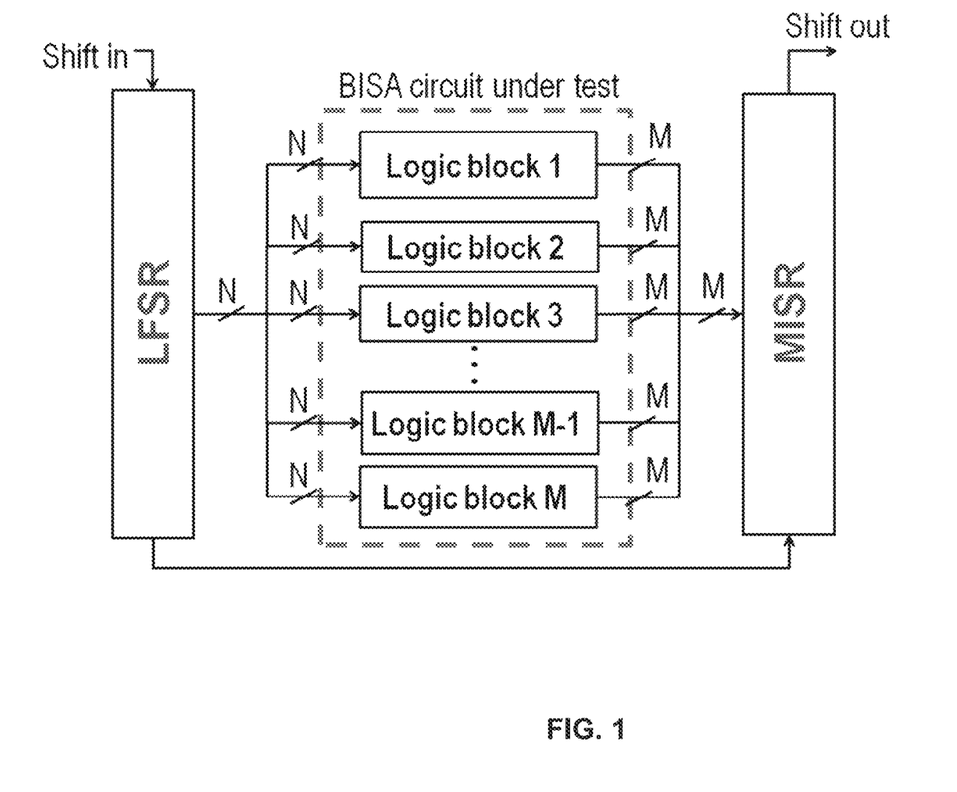
FIG. 1 illustrates a logic test structure for BISA filler cells.

BISA filler cells can be tested with low overhead. FIG. 1 illustrates a logic test structure for BISA filler cells. Logic Built-In Self-Test (LBIST) can be used in the logic test. In an aspect, a plurality of BISA blocks can be coupled between a test pattern generator (TPG) and an output response analyzer (ORA). A smaller combinational circuit with fewer gates can make it easier to obtain higher test coverage. In an aspect, a BISA block can be considered as an independent logic block. TPG can generate test vectors that are shared by all BISA blocks. ORA can process outputs of BISA blocks and generate one or more signatures. As an example, a TPG can comprise linear-feedback-shift-register (LFSR). As another example, an ORA can comprise multiple-input-signature-register (MISR). Other types of TPG and ORA can also be used.

Two operation modes can be associated with a BISA filler cell implemented IC as shown in Table I. In normal mode, original circuits (e.g., functional blocks) are working, but BISA blocks are shut down by blocking clocks to LFSR and MISR. BISA blocks can stay quiet and does not affect the original circuits. On the other hand, in an authentication mode, a slow clock can be provided to BISA blocks. In test mode, one of the sub-modes of an authentication mode, LFSR, can generate N-bit test patterns and apply the N-bit test patterns to all BISA blocks at every clock cycle. At the same time, each BISA block can output one bit so that the MISR can receive a total of M bits from M blocks. When a sufficient number of test patterns are applied during a certain number of clock cycles, BISA blocks can be fully tested. Test value (e.g., generated signatures) can be stored in the MISR. Comparing the obtained signatures with correct signatures can indicate whether the BISA filler cell implemented IC has been tampered with. In an aspect, registers in LFSR and MISR can be connected in series during a shift mode. Signatures in MISR can be shifted out. In the meantime, seed for LFSR can be shifted in during shift mode.

TABLE I

Operation modes in a design with BISA.

|  | Normal | Authentication made | |
| --- | --- | --- | --- |
|  | mode | Shift mode | Test mode |
| Original circuit | Working | Idle | Idle |
| BISA circuit | Idle | Shift seed/signature | Testing BISA |

Figure 2:
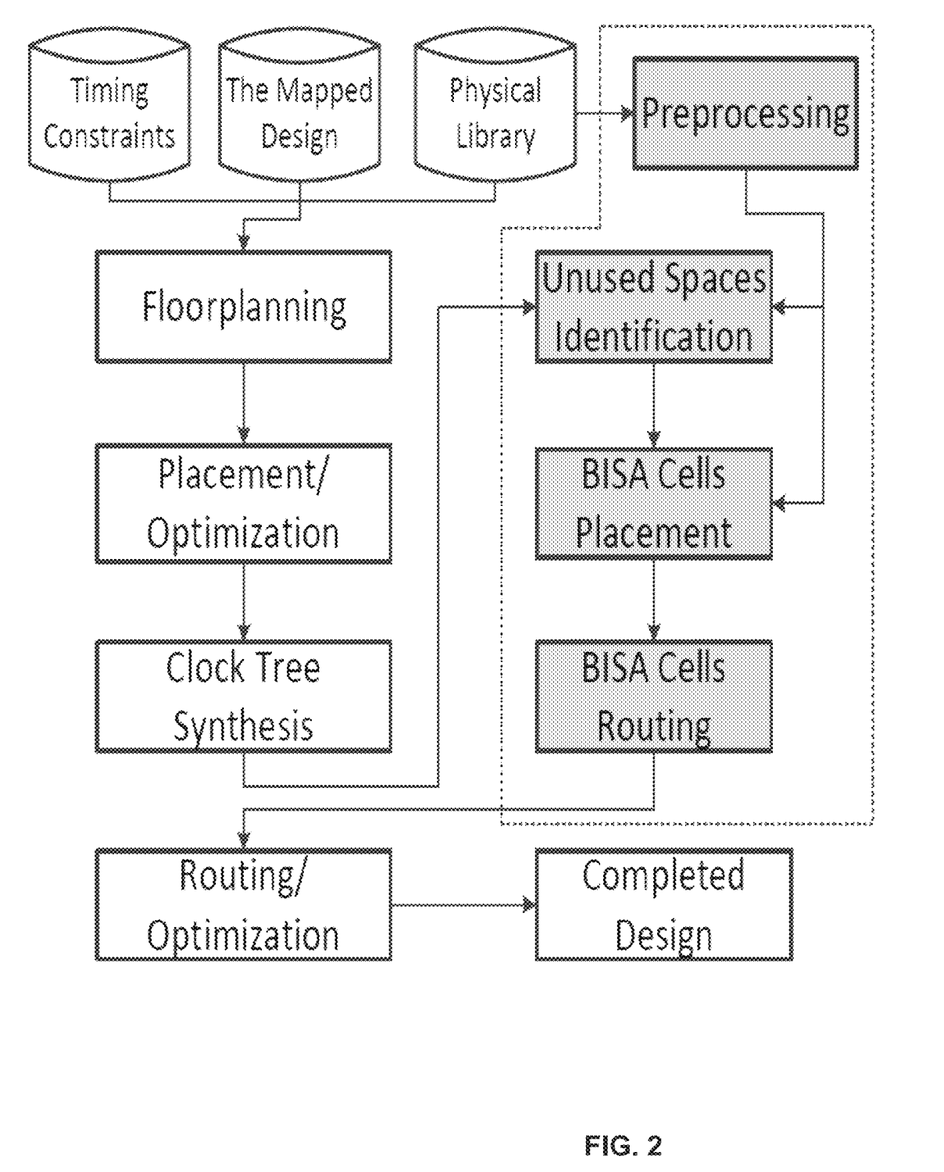
FIG. 2 is a flow chart illustrating BISA filler cells insertion process.

FIG. 2 is a flow chart illustrating BISA filler cells insertion process. In a "preprocessing" step, information associated with a plurality of standard functional cells in a library can be collected. In an aspect, geometrical information of each standard cell, such as length and width, can be collected. If placement direction and location of a particular cell are given, coordinates of four corners of the particular cell can be calculated. In another aspect, a number of input pins and cell name can be collected for the routing phase. In an aspect, a plurality of BISA filler cells can be selected and marked according to following criteria:

In an aspect, BISA filler cells can be minimum-sized cells for different logic to be resilient to resizing attack. Average decoupling capacitance and average input count of a BISA filler cell can also be considered. Average input count and average decoupling capacitance can represent number of inputs and the decoupling capacitance of a standard cell compared to a minimum inverter cell using the same area. Large decoupling capacitance from a BISA filler cell can make up for an absence of decoupling capacitor cells [4]. Fewer inputs count can help to improve test coverage.

In an aspect, the smallest cell (e.g., inverter) from a library can be identified. Table II shows information of a plurality of example cells collected from Synopsys 90 nm library [2]. For the purpose of estimation of capacitance, diffusion capacitance of contacted source and drain region can be comparable to gate capacitance [1]. In Table II, the columns labeled Area and Input show each cell's area and input count. Average input count and average decoupling capacitance can be obtained, which are listed in the fourth and fifth columns of Table II. As an example, NAND2X0 in the third row has two times the input count than does an inverter using in the same area. Decoupling capacitance ratio of 67% shows that NAND2X0 is 33% less than decoupling capacitor cell in same area. If a cell is selected to be used as BISA filler cell, it was marked in the last column of Table II. A cell with fewer inputs and larger decoupling capacitance can have higher priority to be a BISA filler cell. In an aspect, a program can be developed to automatically extract required information and output the extracted information to a standard cell file. The standard cell file can be used before starting a BISA implemented IC design.

TABLE II

Cell information collected during preprocessing step.

| Name | Area | Input | Ave. Input | Ave. Decap. | BISA |
| --- | --- | --- | --- | --- | --- |
| DECAP Cell | 1920 | 0 | 0 | 1 | No |
| INVX0 | 1920 | 1 | 1 | 0.5 | Yes |
| NAND2X0 | 1920 | 2 | 2 | 0.67 | Yes |
| NOR2X0 | 1920 | 2 | 2 | 0.67 | Yes |
| INVX1 | 2240 | 1 | 0.86 | 1 | No |
| AND2X1 | 2560 | 2 | 1.5 | 0.87 | Yes |
| NAND3X0 | 2560 | 3 | 2.25 | 0.56 | Yes |
| OR2X1 | 2560 | 2 | 1.5 | 0.87 | Yes |
| AND3X1 | 2880 | 3 | 2 | 0.83 | Yes |
| NOR3X0 | 2880 | 3 | 2 | 0.5 | Yes |
| NAND4X0 | 2880 | 4 | 2.67 | 0.53 | Yes |
| NAND2X2 | 3200 | 2 | 1.2 | 1.34 | No |
| ... | | | | | |

Figure 3:
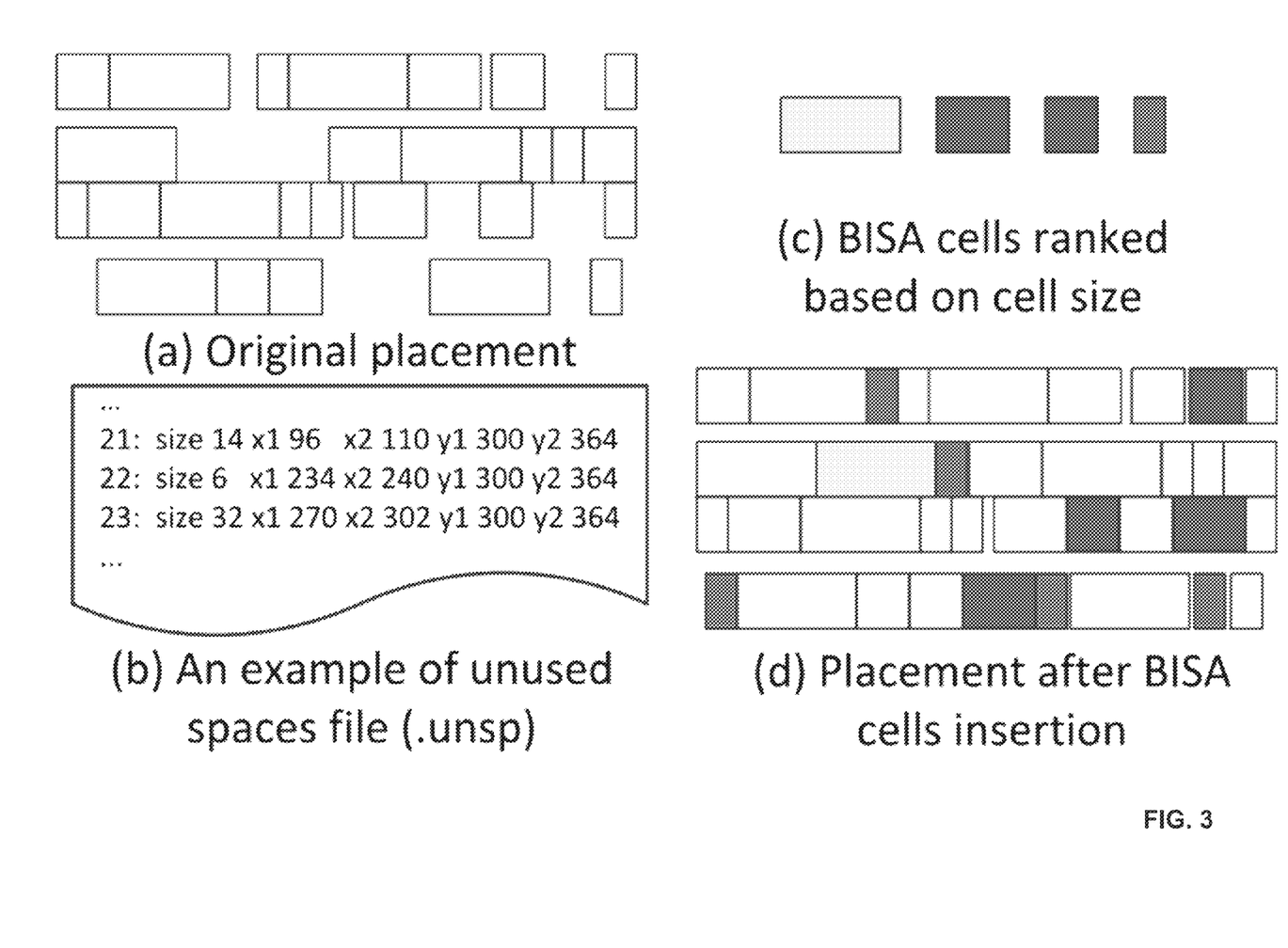
FIG. 3 illustrates BISA filler cells insertion and placement.

In an "unused spaces identification" step, a layout design tool such as Synopsys IC Compiler [3] can write a DEF file (.def) that contains coordinates of all placed standard cells. FIG. 3(a) illustrates original placement of a plurality of standard cells in an IC according to the coordinates of the plurality of standard cells stored in the DEF file. Space between the standard cells can be identified as unused space. By analyzing coordinates of all placed standard cells, location information of all unused spaces can be obtained. A program (e.g., perl script) can be used to help a designer to read DEF file, calculate used spaces and output to an unused spaces file (.unsp). An example of the format of UNSP file is shown in FIG. 3(b). The required information, such as geometry and location of unused space, can be listed in the UNSP file.

In a "BISA cells placement" step, circuit designers can obtain geometry and locations of unused space by reading the UNSP file. One or more BISA filler cells can be used to fill each unused space. For example, a plurality of BISA filler cells can be sorted and ranked by features, such as size, average decoupling capacitance, and average input count. Different regions of the unused space can employ different ranks based on different features. The location and attribute of each region can be given in a constraint file. In an aspect, if a region has high switching during simulation, average decoupling capacitance can be more important because BISA filler cells with larger decoupling capacitors can help reduce voltage drops. In an aspect, ranking by size and average input pins can achieve low cell number and high test coverage. BISA filler cells can be ranked based on cell size. FIG. 3(c) illustrates BISA filler cells ranked based on cell size. The largest cell in FIG. 3(c) can have the highest priority to be inserted. For each unused space, the largest cell can be the first to be tried until the remaining space is smaller than this cell. Then the second largest cell can be tried in the same manner. This process can be repeated until the smallest BISA filler cell has been tried, and eventually no more cells can be added to the layout of a circuit. FIG. 3(d) illustrates placement after BISA filler cell insertion. The layout after BISA filler cell insertion is shown in FIG. 3(d). It can be seen there can be some gaps left between inserted BISA filler cells, but not even the smallest cell can be inserted. In an aspect, the cell placement step can be achieved by a program to simulate cell insertion process and produce a tcl command script for Synopsys IC compiler. Whenever a new BISA filler cell is inserted, a corresponding command for layout design tool can be generated and saved in the command script.

In "BISA cells routing" step, all placed BISA filler cells can to be connected to form a number of BISA blocks. Test coverage can be a key parameter BISA blocks. In an aspect, maximum number of BISA blocks can be created to make each BISA block with minimum gates so that high test coverage can easier to achieve. In an aspect, before BISA cells routing, one already knows how many BISA blocks can be generated. K BISA filler cells can be divided into M BISA blocks equally (M is the size of MISR), so K/M BISA filler cells can be put in one set. In an aspect, in order to maximize testable BISA filler cells, the number of redundant gate in a BISA block needs to be minimized.

Figure 4:
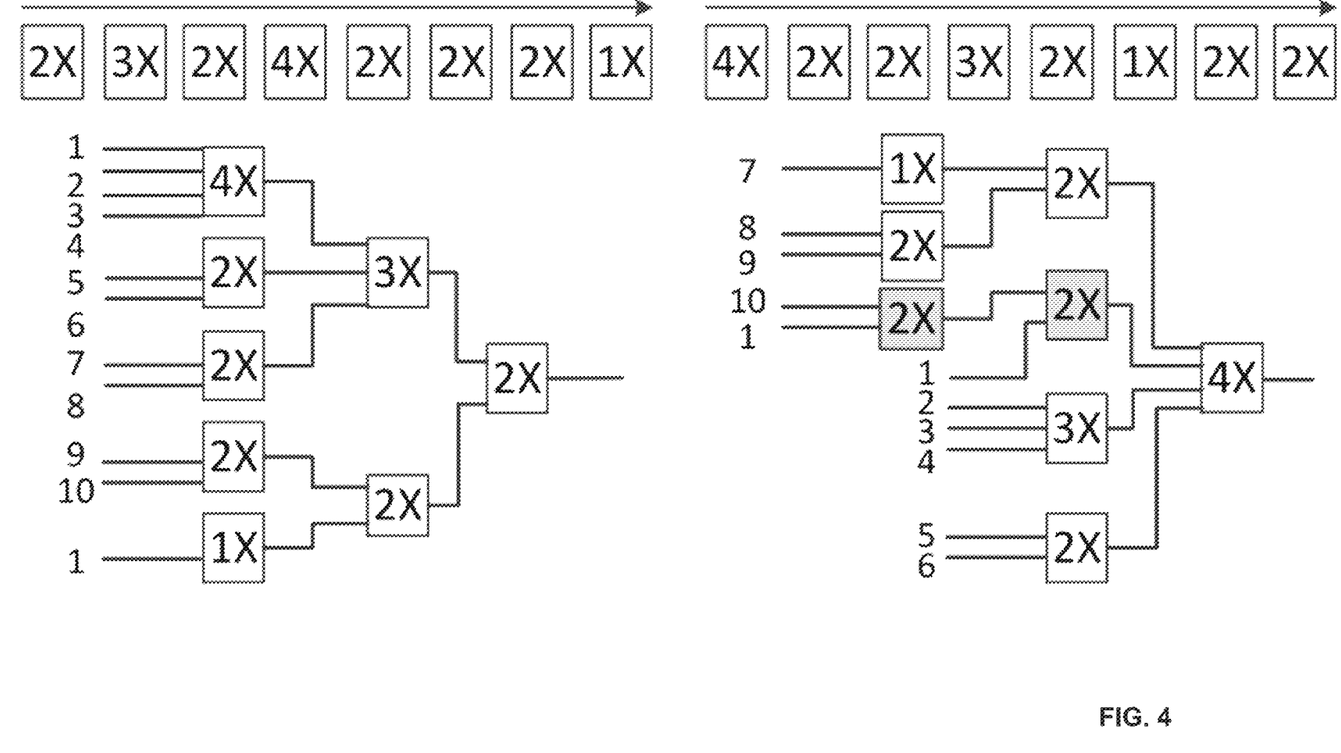
FIG. 4 illustrates BISA filler cells connection and routing.

In an aspect, a tree-structure circuit can be constructed for each BISA block. For example, if every input is independent of other inputs, every net in the tree-structure can become controllable and observable in the tree-structure circuit, and full stuck-at test coverage can be achieved. A tree-structure BISA block can be constructed according to the sequence of BISA filler cells in a block set. FIG. 4 shows that two different sequences can lead to two different tree-structure circuits. The number in each cell indicates its input count. The first gate can be used as the root of tree-structure circuitry which is the top (first) level, and then next x cells (x being the number of inputs of the root cell) can be connected to its inputs as its children cells which can be in the second level. Cells in a third level can be connected to cells in the second level in the same manner. Therefore, cells can be sequentially connected to cells in upper level until all of them are processed, as shown in FIGS. 4(a) and 4(b). After completing routing in each BISA block, all inputs of each block should be connected to LFSR sequentially to minimize the number of shared inputs. The outputs from M BISA blocks can be connected to a MISR with size of M.

In an aspect, as BISA filler cells are added to a BISA block, the number of inputs can increase consistently. If the number of inputs of one BISA block is greater than a LFSR can provide, certain number of inputs have to share LFSR outputs in a broadcasting fashion. However, dependence between several pairs of inputs can result in redundant gates in BISA blocks, thereby affecting fault coverage. Routing extra BISA filler cells can make routing process more complex. In order to cope with pressure from limited routing area, BISA filler cells can be assigned into a closest BISA block to shorten the interconnections among BISA filler cells in a BISA block in a greed fashion. A slow test clock can be used to test BISA blocks in authentication mode. For example, a slow test clock can be estimated according to process technology and maximum stage of a BISA block. In an aspect, BISA filler cells can use any available metal layer of an IC. In an aspect, a program can generate a script for Synopsys IC Compiler to create nets and connect a plurality of BISA filler cells logically. Both original circuit and BISA filler cells can be physically routed during routing and optimization. As an example, once timing and sign-off of an IC design are successful, GDSII/OASIS format of the IC design can be generated for final tape-out.

SOC is a typical bottom-up hierarchical design. SOC can comprise a top module includes a plurality of predesigned sub-modules or known as intellectual property (IP) cores. BISA filler cell design in top module of a SOC design can be similar to that of a flat design. In an aspect, IP cores can be much larger than standard functional cells used in IC, large empty spaces may be left between IP cores. Thus, for a SOC design, BISA filler cell insertion flow can be used to fit unused spaces between IP cores and/or standard functional cells. For a SOC design, organization of LFSRs/MISRs in the top module or a sub-module needs to be considered in order to minimize area overhead. As an example, two structure topologies can be used, namely distributed topology and centralized topology. In distributed topology, each IP core and top module can have its own LFSR/MISR. In centralized topology, one centralized LFSR and one centralized MISR in top module or one of sub-modules can be used to provide test patterns and compact responses for BISA blocks in top module and sub-modules.

In an aspect, if every input is independent, the testable stuck-at fault test coverage of each tree-structure BISA block would be 100%. However, if two or more inputs share a same output from LFSR, the dependence among these shared inputs can reduce the controllability and/or observability and eventually bring down test coverage. Excessive BISA filler cells in a BISA block or small LFSR/MISR can result in inputs sharing among a plurality of BISA blocks. As an example, a BISA block in FIG. 4(b) has 11 input pins, the size of LFSR is 10, which is one bit less than inputs of the BISA block. Thus, one input pin has to share with another input pin in the BISA block. In FIG. 4(b), it should be noted two dark gates can share a first bit of LFSR (input labeled "1"). An example method to ensure full fault coverage can be to increase size of LFSR or MISR. Since all BISA blocks can be tree-structure circuits, the signal that goes through two pins farther removed from each other can have converge later so that fewer gates can be influenced.

In addition to improving test coverage, BISA filler cells can be immune to different attacks that attempt to create space for Trojan gates via removal, redesign, resizing or bypassing. As BISA filler cells are the same as other circuit cells, it can be difficult for an adversary to identify them. Attacks can be divided into two categories according to targets, filler cells or original circuit.

Four potential attacks on these two targets are discussed below.

Removal Attack

Removal attack can be the most direct and simplest way to create space for Trojan gates. Removing BISA filler cells can change functionality of BISA blocks. Test patterns can test the functionality of BISA blocks, and BISA signatures can tell whether a BISA filler cell is present. If one or more functional BISA filler cells are removed by adversaries, functionality can be altered. Both functional test and structural test can be able to detect removal attacks.

Redesign Attack

Adversary changes of a gate in BISA filler cells or original circuit can be detected when functionality of BISA filler cells or original circuit is altered. If an adversary redesigns layout of an original circuit to achieve the same functionality and insert Trojan gates, the original circuit dimensions can be changed. The change can result in different placement for some or all design components. Any changes in physical layout of a circuit can change delay characteristic and power characteristics of the original circuit, which can make it easier to detect a hardware Trojan.

Resizing Attack

As BISA filler cells are already of minimum size and cannot shrink any further, standard functional cells in an original circuit design can be resized to use smaller standard cells with same logic. In this scenario, performance of original circuit design can be affected by using smaller functional cells.

TPG/ORA Attack

TPG and ORA can be used to generate patterns and signatures. TPG and/or ORA can be possible targets for an adversary. Any modification to a register and/or an XOR gate in TPG or ORA can result in different patterns and signatures. No matter what change is made, a different signature can indicate a circuit is tampered. If an attacker acquires generated test patterns and corresponding signature by attacking TPG or ORA, the attacker can store test patterns and corresponding signature and bypass BISA filler cells, and output stored test patterns and corresponding signature, in order to pretend BISA filler cells are working normally. However, bypassing attack can be detected, because seed of LFSR can be changed at any time so that a new set of test vectors and their new signatures can be generated. The adversary cannot predict seeds of LFSR, therefore, the trustworthiness of BISA can be ensured by applying different seeds.

In an aspect, silicon defects can be unavoidable during an integrated circuit fabrication. An integrated circuit producing a faulty signature may contain hardware Trojans, but can also have been caused by defects in BISA filler cells, LFSR or MISR, while the original circuits are working well. Hardware Trojan is intentionally inserted into all or a portion of ICs by adversaries, while defects can be random due to imperfect manufacturing process. Therefore, the probability of two integrated circuits (IC) with a same defect can be low, but ICs with same Trojan can produce same faulty signatures, which can be an indication to separate IC with random defect from IC with hardware Trojans. ICs with same right signatures and same faulty signatures can be suspected as Trojan infected ICs. If faulty signatures from one IC are completely different from another IC, faulty signatures probably have resulted from random defects.

Figure 5:
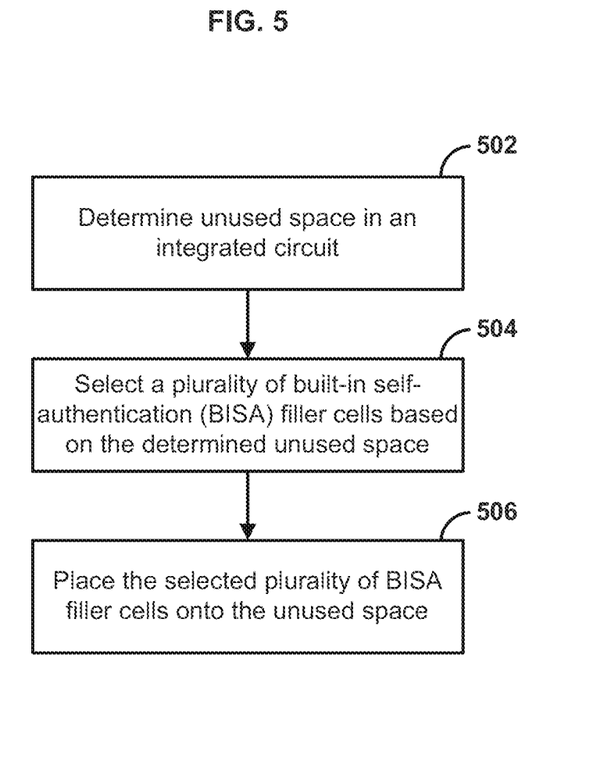
FIG. 5 is a flowchart illustrating an example method for preventing hardware Trojan insertion.

In an aspect, illustrated in FIG. 5, provided are methods for preventing hardware Trojan insertion. At step 502, unused space in an integrated circuit can be determined. In an aspect, determining unused space in the integrated circuit can comprise determining location and geometry (e.g., length, width) of the unused space. As an example, geometry can comprise size, coordinate of corners associated with the unused space. As another example, location can comprise information of the closest functional blocks on the IC. In an aspect, the integrated circuit can be a flat integrated circuit. In another aspect, the integrated circuit can be a system-on-chip integrated circuit.

At step 504, a plurality of built-in self-authentication (BISA) filler cells can be selected based on the determined unused space. In an aspect, selecting a plurality of BISA filler cells can comprise collecting information associated with a plurality of standard BISA filler cells, and selecting a plurality of BISA filler cells from the plurality of standard BISA filler cells based on the collected information and the determined unused space. As an example, the information can comprise geometrical information, number of input pins, cell name, and cell area. In an aspect, a cell with fewer inputs and larger decoupling capacitance can have higher priority to be a BISA filler cell.

At step 506, the selected plurality of BISA filler cells can be placed onto the unused space. In an aspect, placing the selected plurality of BISA filler cells onto the unused space can comprise ranking the selected plurality of BISA filler cells according to one or more features, and placing the selected plurality of BISA filler cells via placing a higher ranked BISA filler cell of the selected plurality of BISA filler cells prior to placing a lower ranked BISA filler cell of the selected plurality of BISA filler cells. In an aspect, for each unused space, the largest cell can be the first to be inserted until the remaining space is smaller than this cell. Then the second largest cell can be tried in the same manner. This process can be repeated until the smallest BISA filler cell has been tried, and eventually no more cells can be added to the layout of a circuit. In an aspect, the one or more features can comprise cell size, decoupling capacitance, and number of input pins. In an aspect, different regions of the unused space can employ different ranks based on different features. If a region has high switching during simulation, decoupling capacitance can be more important because BISA filler cells with larger decoupling capacitors can help reduce voltage drops. In an aspect, ranking by size and input pins can achieve low cell number and high test coverage.

In an aspect, the selected plurality of BISA filler cells can be connected to form a plurality of BISA blocks. In an aspect, maximum number of BISA blocks can be created to make each BISA block with minimum gates so that high test coverage can easier to achieve. As an example, the plurality of BISA blocks can comprise tree structure circuits. In an aspect, logic of the plurality of BISA blocks can be tested. As an example, logic of the plurality of BISA blocks can be achieved via coupling the plurality of BISA blocks between a test pattern generator (TPG) and an output response analyzer (ORA). In an aspect, the plurality of BISA blocks can correspond to a plurality of signatures in logic testing. The plurality of signatures can be used to determine whether the integrated circuit has been tampered with.

Figure 6:
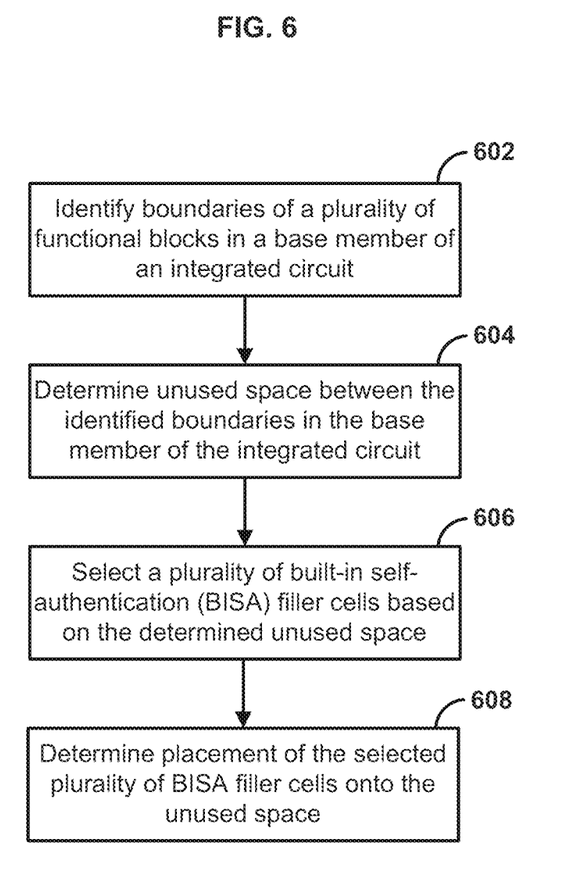
FIG. 6 is a flowchart illustrating an example method for designing BISA filler cell implemented integrated circuit.

In an aspect, illustrated in FIG. 6, provided are methods for designing BISA filler cell implemented integrated circuit. At step 602, boundaries of a plurality of functional blocks in a base member of an integrated circuit can be identified. For example, identifying boundaries of the plurality of functional blocks can comprise identifying geometry, size, location of the plurality of functional blocks and associated access pin (e.g., input pins, output pins) on the base member of an integrated circuit.

At step 604, unused space between the identified boundaries in the base member of the integrated circuit can be identified. In an aspect, determining unused space in the integrated circuit can comprise determining location and geometry (e.g., length, width) of the unused space. As an example, geometry can comprise cell size, coordinate of corners associated with the unused space. As another example, location can comprise information of the closest functional blocks on the IC. In an aspect, the integrated circuit can be a flat integrated circuit. In another aspect, the integrated circuit can be a system-on-chip integrated circuit.

At step 606, a plurality of built-in self-authentication (BISA) filler cells can be selected based on the determined unused space. In an aspect, selecting a plurality of BISA filler cells can comprise collecting information associated with a plurality of standard BISA filler cells, and selecting a plurality of BISA filler cells from the plurality of standard BISA filler cells based on the collected information and the determined unused space. As an example, the information can comprise geometrical information, number of input pins, cell name, and cell size. In an aspect, a cell with fewer inputs and larger decoupling capacitance can have higher priority to be a BISA filler cell.

At step 608, placement of the selected plurality of BISA filler cells onto the unused space can be determined. In an aspect, determining placement of the selected plurality of BISA filler cells onto the unused space can comprise ranking the selected plurality of BISA filler cells according to one or more features, and determining placement of the selected plurality of BISA filler cells via placing a higher ranked BISA filler cell of the selected plurality of BISA filler cells prior to placing a lower ranked BISA filler cell of the selected plurality of BISA filler cells. In an aspect, for each unused space, the largest cell can be the first to be placed until the remaining space is smaller than this cell. Then the second largest cell can be tried in the same manner. This process can be repeated until the smallest BISA filler cell has been tried, and eventually no more cells can be added to the layout of a circuit. In an aspect, the one or more features can comprise cell size, decoupling capacitance, number of input pins, cell name and cell size. In an aspect, different regions of the unused space can employ different ranks based on different features. If a region has high switching during simulation, decoupling capacitance can be more important because BISA filler cells with larger decoupling capacitors can help reduce voltage drops. In an aspect, ranking by size and input pins can achieve low cell number and high test coverage.

Figure 7:
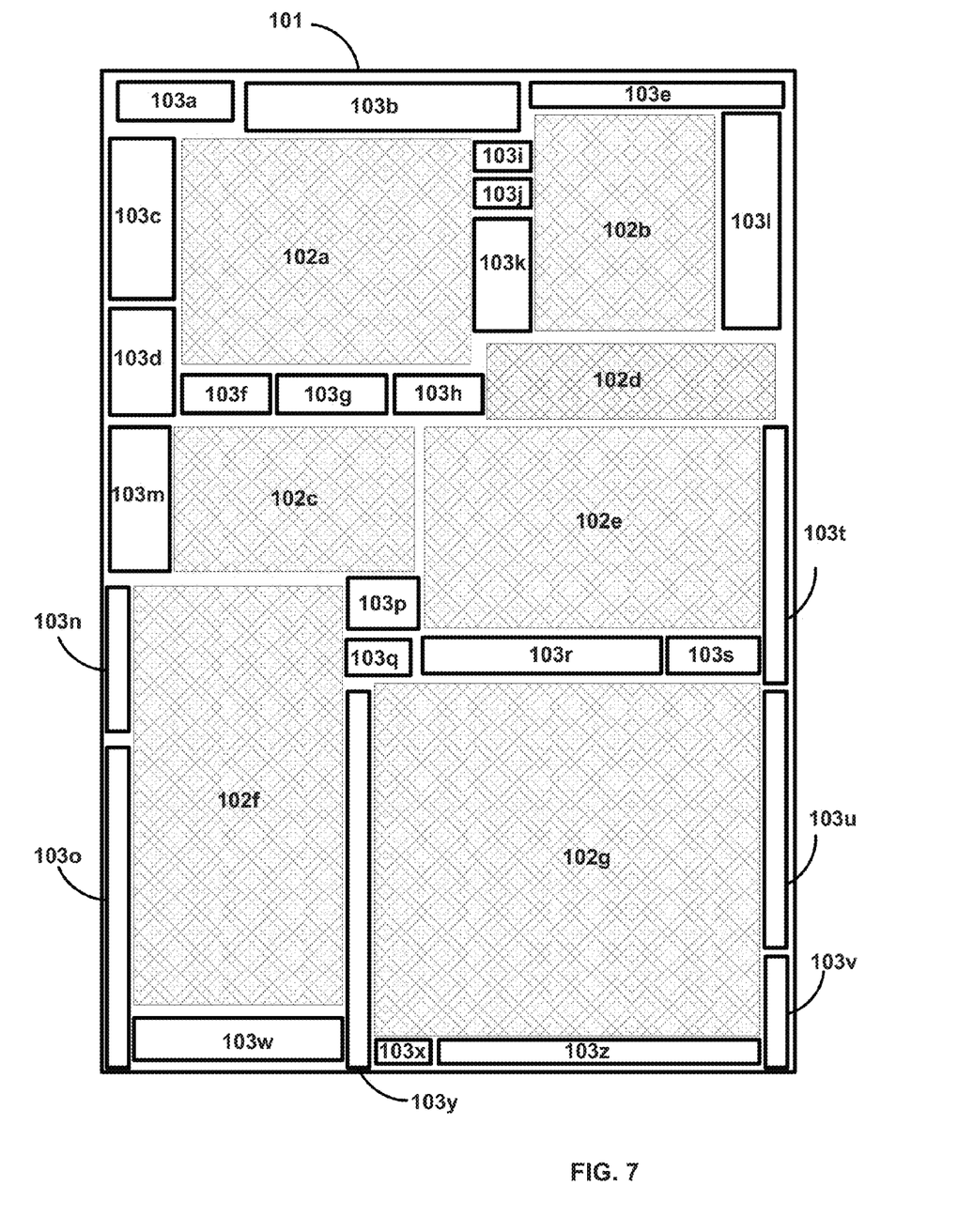
FIG. 7 is an illustration of an example Trojan-resistant apparatus.
Figure 8:
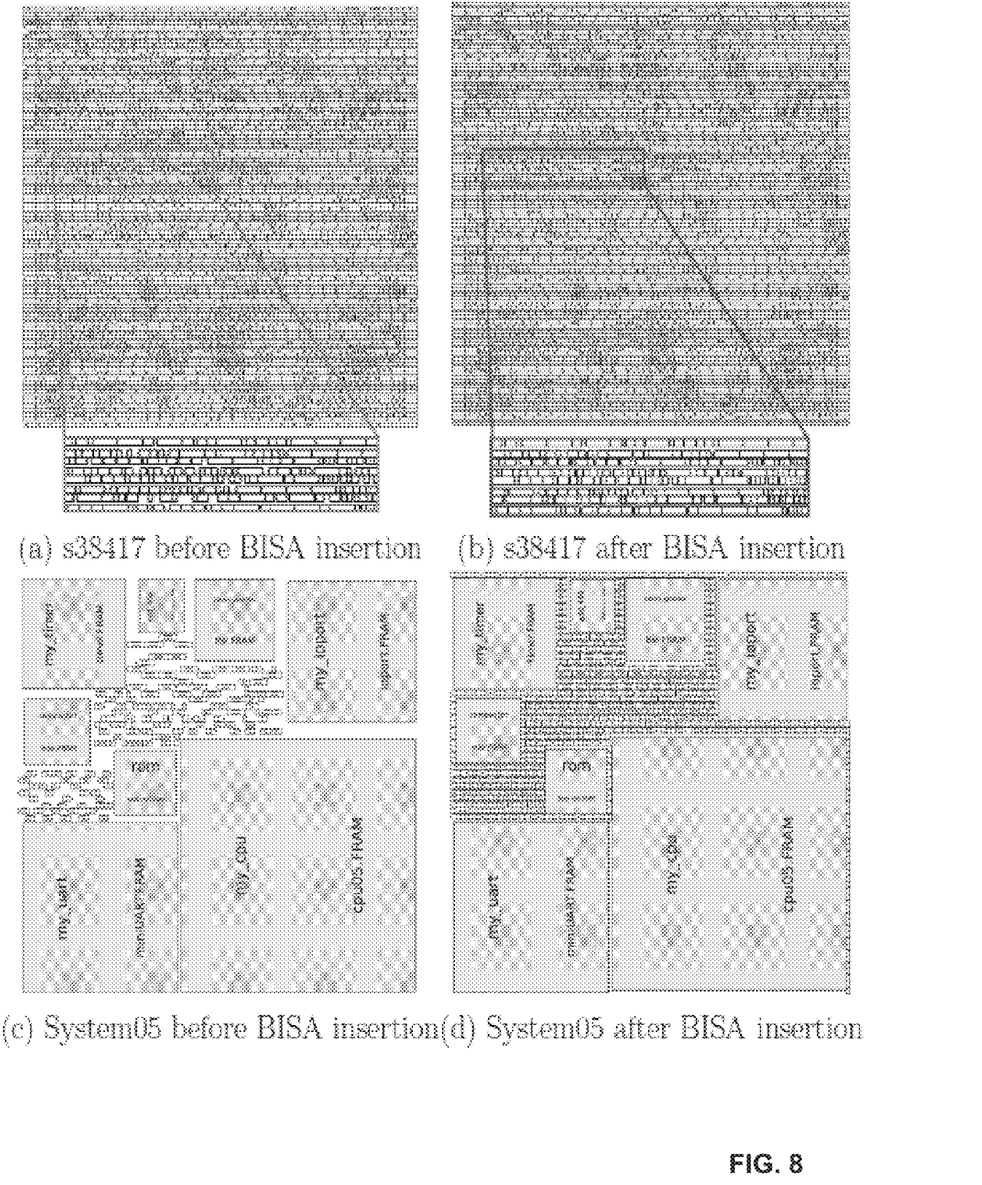
FIG. 8(a) illustrates IC layout before implementing BISA filler cells for s38417.
FIG. 8(b) illustrates IC layout after implementing BISA filler cells for s38417.
FIG. 8(c) illustrates IC layouts before implementing BISA filler cells for System05.
FIG. 8(d) illustrates IC layouts after implementing BISA filler cells for System05.

In an aspect, illustrated in FIG. 7, provided is a Trojan-resistant apparatus. The Trojan-resistant apparatus can comprise a base member 101, a plurality of functional blocks 102a,b,c,d,e,f,g attached to the base member 101, resulting in unused space on the base member. A plurality of BISA filler cells 103a-103z, can be placed in the unused space. In an aspect, the plurality of BISA filler cells 103a-103z can provide decoupling capacitance.

In an aspect, the plurality of BISA filler cells can be connected to form a plurality of BISA blocks. As an example, BISA filler cells 103a,b,c,d,e,m can be connected to form a BISA block. As another example, BISA filler cells 103p,q,r,s,t can be connected to form another BISA block. In an aspect, the plurality of BISA blocks correspond to a plurality of signatures. In an aspect, the plurality of signatures can be obtained via testing logic of the plurality of BISA blocks. As an example, testing logic of the plurality of BISA blocks can comprise coupling the plurality of BISA blocks between a test pattern generator (TPG) and an output response analyzer (ORA). A modification of one or more BISA filler cell can lead to an alteration of one or more signatures. As an example, the modification can comprise removal, redesign, resizing and bypassing one or more BISA filler cells 103a-103z.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

As an example, BISA filler cells are implemented in a plurality of single module designs (s38417, AES) and SOC designs (System05, vga lcd, Leon 3 Microprocessor) with 90 nm technology library [2]. FIGS. 8(a), 8(b), 8(c) and 8(d) show layouts before and after implementing BISA filler cells for s38417 and System05 with Synopsys IC Compiler [3].

Table III shows the detailed information about original design and BISA circuits. Different core utilizations (i.e., layout compaction) have been done in different designs. As core utilization increases, fewer BISA filler cells can be inserted into layout to fill empty spaces. Therefore, high utilization is highly recommended in BISA design.

TABLE III

BISA implementation under different utilizations.

| Benchmark | Standard Cells | Core Utilization | BISA Cells |
|---|---|---|---|
| s38417 | 5242 | 90% | 131 |
| s38417 | 5242 | 80% | 180 |
| s38417 | 5242 | 70% | 982 |
| AES | 26447 | 93% | 5925 |
| AES | 26447 | 90% | 5971 |
| AES | 26447 | 85% | 5998 |
| System 05 | 2284 | Fit | 418 |
| vga_lcd | 124031 | Fit | 40719 |
| Leon 3 | 545836 | Fit | 64728 |

In a large design, core utilization cannot be very high due to conservative floor planning tool. As an example, 93% is the highest core utilization for a benchmark AES, while 99% core utilization can be achieved with small benchmark s38417. Therefore, there can be space left in a large circuit, which can be sufficient to place post-design LFSR and MISR. For SOC designs, "Fit" core utilization means the most compact floor planning that allows all IP cores placed without violations. A plurality of BISA filler cells need to be inserted in three SOC designs, as shown in Table III. On the other hand, since the gaps between IP cores are very large, large post-design LFSR and MISR can be inserted in unused spaces to ensure high test coverage. BISA does not increase circuit dynamic power, however, it can impact circuit leakage power since BISA components can draw leakage current during functional operation.

Although there is no decoupling capacitor cell after applying BISA, BISA filler cells that are selected from standard cells are able to provide decoupling capacitance to some degree [4]. During BISA preprocessing step, cells with high decoupling capacitors can be selected. BISA filler cells can be sources of decoupling capacitance. The comparison in Table II shows BISA cell can provide about two third decoupling capacitance of traditional decoupling capacitor using the same area.

Figure 9:
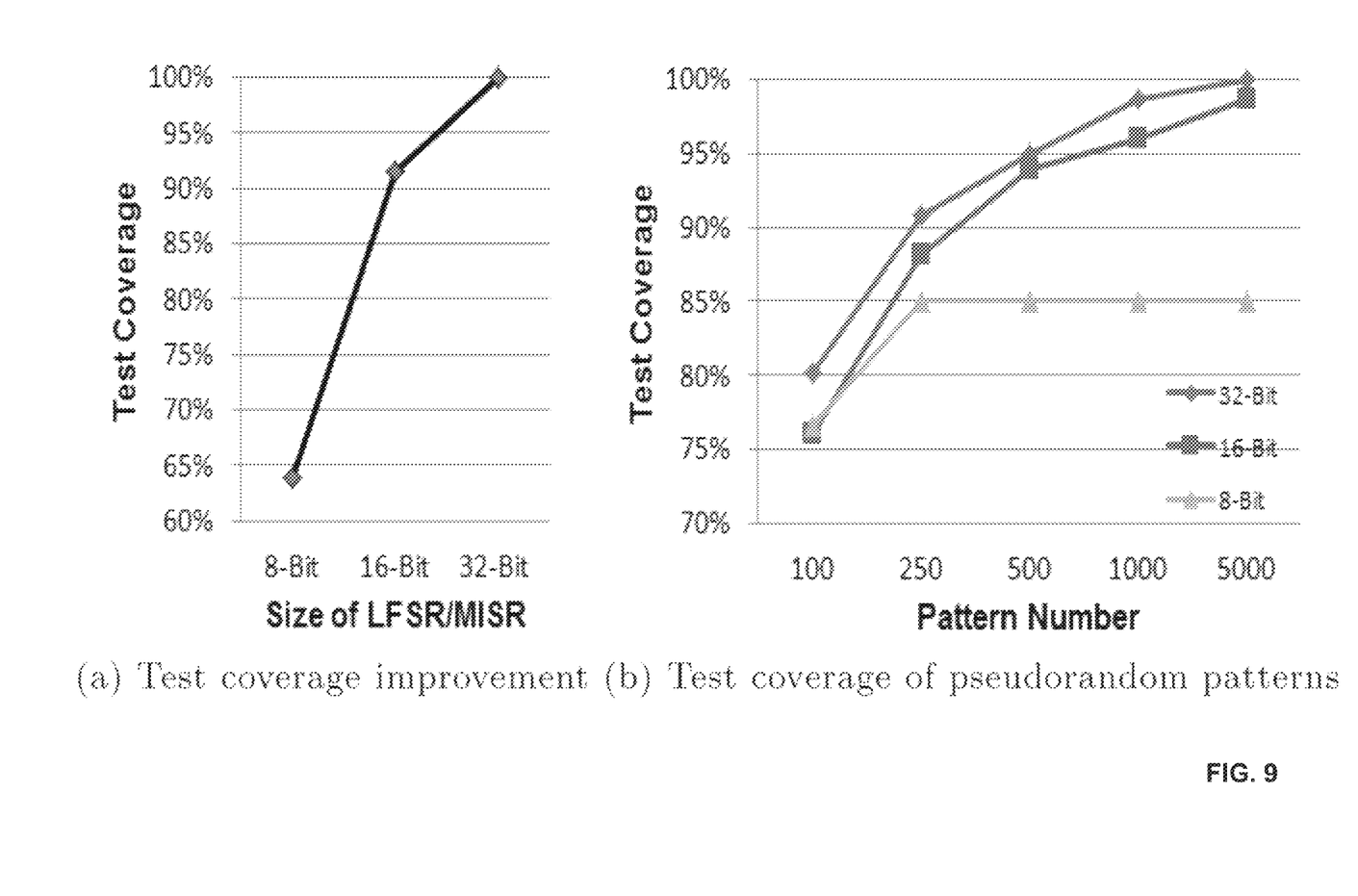
FIG. 9(a) illustrates test coverage for 32-bit, 16-bit and 8-bit sizes of LFSR.
FIG. 9(b) illustrates different numbers of test patterns and their respective coverages.

Test coverage can be a critical parameter for BISA blocks, as it reflects the confidence level of BISA's result. FIG. 9 shows the BISA test coverage by performing fault simulation when BISA is inserted in s38417 benchmark with core utilization at 80%. In FIG. 9(a), different sizes of LFSR, such as 32-bit, 16-bit and 8-bit are investigated. After 500 test vectors generated from LFSR are applied, improvements are 27.63% and 36.1% for 16-bit and 32-bit LFSR respectively. Since 32-bit LFSR is able to provide 32 independent inputs to BISA blocks which is larger than the number of inputs of any BISA block, the test coverage is 100%. Different numbers of test patterns can be applied and their respective coverages are shown in FIG. 9(b). As number of test patterns increases, test coverage can continuously increases especially for larger LFSRs. The highest test coverage can be achieved by applying different seeds to generate all required test patterns.

In order to demonstrate that BISA is immune to attacks, ten cases of attacks are made to verify its effectiveness. In the system05 SOC design, 418 BISA cells are inserted to fill unused spaces. LFSR and MISR with size of 32 are used to form BISA structure. 616 ATPG patterns can reach 99.65% testable coverage.

When 500 patterns from LFSR are applied, the stuck-at fault test coverage is 81%. In Table IV, case 0 shows genuine results. Five kinds of gates are selected to be removed from different BISA blocks separately. In addition, another five types of gates are selected to be changed to other types of gates in different BISA blocks separately. The results often cases are shown in Table IV. In each case, the signature generated from MISR is different from the genuine signature, which shows that BISA has detected Trojan attacks. In Table IV, an internal cell means it has children cells. Similarly, a leaf cell is a cell that does not have children cells.

TABLE IV

Attack Summary.

| Case | Type | Attack Description | Signature |
|---|---|---|---|
| 0 | Genuine | None | 0712022D |
| 1 | Removal | Remove a leaf cell | 0DA8936E |
| 2 | Removal | Remove an internal cell | 157F4929 |
| 3 | Removal | Remove a leaf cell | 0ED740FC |
| 4 | Removal | Remove an internal cell | D5E2706E |
| 5 | Removal | Remove an internal cell | 43D51D83 |
| 6 | Change | Change a leaf cell OR3X1 to AND3X1 | F2308684 |
| 7 | Change | Change an internal cell AOI222X1 to OAI222X1 | 157F4929 |
| 8 | Change | Change a root cell AOI222X1 to OAI222X1 | F39C3B1E |
| 9 | Change | Change a leaf cell AND3X1 to NAND2X1 | 157F4929 |
| 10 | Change | Change an internal cell NAND4X1 to NAND3X1 | 0B17041F |

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

REFERENCES

[1] N. Weste and D. Harris, "CMOS VLSI Design: A Circuits and Systems Perspective," 4th edition, Addison-Wesley, 2010
[2] Synopsys Inc., "Synopsys 90 nm Generic Library for Teaching IC Design," University program
[3] Synopsys Inc., "IC Compiler, The next-generation physical design system," Synopsys Datasheet, 2010
[4] C. Yeh and M. Marek-Sadowska, "Timing-aware power noise reduction in placement," IEEE Transactions on Computer-Aided Design of Integrated Circuits and Systems, Vol. 26, Issue 3, pp. 527-541, 2007

What is claimed is:

1. A method comprising:
   determining unused space in an integrated circuit;
   selecting a plurality of built-in self-authentication (BISA) filler cells based on the determined unused space, wherein selecting the plurality of BISA filler cells comprises ranking a plurality of standard circuit cells having a variety of functions and sizes for placement in the unused space, wherein the plurality of standard circuit cells are ranked based on cell size, decoupling capacitance, and number of input pins; and
   placing the selected plurality of BISA filler cells onto the unused space by placing higher ranked standard circuit cells of the plurality of standard circuit cells prior to placing lower ranked standard circuits cells of the plurality of standard circuit cells.

2. The method of claim 1, wherein determining unused space in the integrated circuit comprises determining location and geometry of the unused space.

3. The method of claim 1, wherein selecting the plurality of BISA filler cells comprises:
   collecting information associated with the plurality of standard circuit cells; and
   selecting the plurality of BISA filler cells from the plurality of standard circuit cells based on the collected information and the determined unused space.

4. The method of claim 3, wherein the information comprises geometrical information, number of input pins, cell name, and cell size.

5. The method of claim 1, further comprising:
   connecting the selected plurality of BISA filler cells to form a plurality of BISA blocks.

6. The method of claim 5, wherein the plurality of BISA blocks comprise tree structure circuits.

7. A method comprising:
   identifying boundaries of a plurality of functional blocks in a base member of an integrated circuit;
   determining unused space in the base member of the integrated circuit between the identified boundaries;

selecting a plurality of built-in self-authentication (BISA) filler cells based on the determined unused space, wherein selecting the plurality of BISA filler cells comprises ranking a plurality of standard circuit cells having a variety of functions and sizes for placement in the unused space, wherein the plurality of standard circuit cells are ranked based on cell size, decoupling capacitance, and number of input pins; and determining placement of the selected plurality of BISA filler cells onto the unused space by determining placement of higher ranked standard circuit cells of the plurality of standard circuit cells prior to determining placement of lower ranked standard circuits cells of the plurality of standard circuit cells; and providing instructions indicative of the determined placement of the selected plurality of BISA filler cells to a device configured to place the selected plurality of BISA filler cells on the integrated circuit.

8. The method of claim 7, wherein determining unused space in the base member of the integrated circuit comprises determining location and geometry of the unused space.

9. The method of claim 7, wherein selecting a plurality of BISA filler cells comprises:
  collecting information associated with the plurality of standard circuit cells; and
  selecting the plurality of BISA filler cells from the plurality of standard circuit cells based on the collected information and the determined unused space.

10. The method of claim 7, further comprising:
  determining connection of the selected plurality of BISA filler cells to form a plurality of BISA blocks.

11. The method of claim 10, wherein the plurality of BISA blocks comprise tree structure circuits.

12. An integrated circuit comprising:
  a base member;
  a plurality of functional blocks attached to the base member, resulting in unused
    space on the base member; and
  a plurality of built-in self-authentication (BISA) filler cells placed in the unused space, wherein the plurality of BISA filler cells comprise a plurality of standard circuit cells having a variety of functions and sizes that are selected for placement in the unused spaced based on ranking the plurality of standard circuit cells, wherein the plurality of standard circuit cells are ranked based on cell size, decoupling capacitance, and number of input pins, wherein the plurality of BISA filler cells are connected to form a plurality of BISA blocks, and wherein the plurality of BISA blocks correspond to a plurality of signatures.

13. The integrated circuit of claim 12, wherein the plurality of BISA filler cells provide decoupling capacitance for the integrated circuit.

14. The integrated circuit of claim 12, wherein a modification of one or more BISA filler cell of the plurality of BISA filler cells leads to an alteration of one or more signatures.

15. The method of claim 1, wherein cells of the plurality of standard circuit cells having a lower number of inputs and a larger decoupling capacitance are ranked above cells of the plurality of standard circuit cells having a larger number of inputs and a lower decoupling capacitance for placement in the used space.

16. The method of claim 1, wherein the unused space comprises a plurality of regions of unused space, and wherein different regions of the plurality of regions of unused space have different ranking criteria for selecting the BISA filler cells based on differing characteristics of the regions of plurality of regions of unused space.

17. The method of claim 1, wherein the plurality of standard circuit cells are ranked based on average decoupling capacitance for placement in the unused space.

18. The method of claim 1, wherein selecting the plurality of BISA cells comprises prioritizing, for placement in the unused space, selection of a minimum-sized logic cell of a group of logic cells having the same functionality above selection of other sized logic cells of the group of logic cells.

* * * * *